United States Patent
Brady et al.

(12) 
(10) Patent No.: US 6,984,340 B1
(45) Date of Patent: Jan. 10, 2006

(54) CORROSION INHIBITING FORMULATIONS

(75) Inventors: Arthur Albert Brady, Cheshire (GB); Brian George Clubley, Cheshire (GB)

(73) Assignee: Brad-Chem Technology Limtied (GB)

( * ) Notice: Subject to any disclaimer, the term of this patent is extended or adjusted under 35 U.S.C. 154(b) by 1127 days.

(21) Appl. No.: 09/668,518

(22) Filed: Sep. 22, 2000

(30) Foreign Application Priority Data

Oct. 14, 1999 (GB) ............................................... 9924358

(51) Int. Cl.
*C09K 3/00* (2006.01)

(52) U.S. Cl. ...................... 252/388; 252/387; 252/175; 252/73; 252/75; 252/77; 252/78.5

(58) Field of Classification Search ................. 252/388, 252/387, 175, 77, 78.5, 75, 73
See application file for complete search history.

(56) References Cited

U.S. PATENT DOCUMENTS

| | | | |
|---|---|---|---|
| 3,034,907 A | 5/1962 | Kleeman et al. | |
| 4,687,590 A | * 8/1987 | Haack | .......................... 252/75 |
| 4,734,209 A | 3/1988 | Phillips et al. | |
| 4,752,443 A | * 6/1988 | Hoots et al. | ................... 422/13 |

FOREIGN PATENT DOCUMENTS

| | | |
|---|---|---|
| DE | 196 48 843 A1 | 6/1998 |
| EP | 0 046 139 A1 | 2/1982 |
| EP | 0 737 684 A1 | 10/1996 |
| FR | 2 298 543 | 8/1976 |
| GB | 2 204 864 A | 11/1988 |
| JP | 58-130284 | 8/1983 |
| WO | WO 93/06198 | 4/1993 |

\* cited by examiner

*Primary Examiner*—Yogendra N. Gupta
*Assistant Examiner*—D. G. Hamlin
(74) *Attorney, Agent, or Firm*—Jenkins, Wilson & Taylor, P.A.

(57) ABSTRACT

The present invention relates to formulations for corrosion-inhibiting, emulsifying, lubricating or as a surfactant in organic hydrocarbon and/or water based system containing an acyl amino acid derivative and a triazole derivative.

18 Claims, No Drawings

CORROSION INHIBITING FORMULATIONS

FIELD OF THE INVENTION

The present invention relates to improvements in and relating to corrosion inhibiting formulations.

BACKGROUND OF THE INVENTION

A wide variety of additives have been developed and are in commercial use for the protection of metals against corrosion in organic or aqueous media.

Amongst ferrous metal corrosion inhibitors, carboxylic acids are widely used, for example, those with long chain alkyl or aryl groups which impart solubility to the carboxylic acids in organic systems, for example hydrocarbon oils. Particularly effective compounds are acyl amino acids of structure (I):

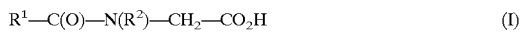
$$R^1\text{—}C(O)\text{—}N(R^2)\text{—}CH_2\text{—}CO_2H \qquad (I)$$

where $R^1$ is a long chain alkyl group and $R^2$ is hydrogen or methyl.

Where water solubility is required, it is common practice to employ a water soluble salt of the carboxylic acid, for example, a sodium salt or a trialkanolamine salt. Amongst non-ferrous metal corrosion inhibitors (also known as metal passivators or deactivators), the most widely used compounds for protection of copper and copper alloys are triazole derivatives, particularly benzotriazole or tolutriazole. As above, derivatives are well known which enhance solubility in organic hydrocarbons or water. For example structures of formula (II) are in commercial use:

$$T^1\text{—}CH_3\text{—}NR^3{}_2 \qquad (II)$$

where $T^1$ is a triazole derivative, $R^3$ is hydroxyalkyl (for water solubility) or alkyl (for oil solubility).

When ferrous metal and non-ferrous metal corrosion inhibition are both required in an oil-based medium two oil-soluble corrosion inhibitors are used. Similarly, when both ferrous metal and non-ferrous metal corrosion inhibitors are required in an aqueous medium, two water-soluble corrosion inhibitors are used.

However, in a number of applications, solubility of the corrosion inhibitor in both organic hydrocarbons and water is desirable. Such applications include, but are not limited to, those involving emulsions or those where water may be present as a contaminant of oil styrene and vice versa. Applications where dual solubility would be of utility include, but are not limited to, industrial oils, crankcase lubricants, metalworking fluids, hydraulic fluids, rolling oils, brake fluids, fuel systems, surface coatings and water-soluble paints.

In an effort to reduce the amount of organic hydrocarbon material used in many technologies, aqueous emulsion formulations are being developed so that the range of technical areas in which emulsions will have importance is increasing. However, the conventional corrosion inhibition compounds described above result in either organic solubility or water solubility.

It is an aim of preferred embodiments of the present invention to provide an improved corrosion inhibitor.

SUMMARY OF THE INVENTION

According to a first aspect of the present invention there is provided a formulation comprising:

a) an acyl amino acid derivative of the formula (III);

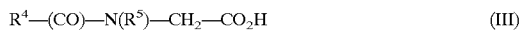
$$R^4\text{—}(CO)\text{—}N(R^5)\text{—}CH_2\text{—}CO_2H \qquad (III)$$

in which
$R^4$ is $C_8$–$C_{30}$ optionally substituted alkyl and $R^5$ is hydrogen or methyl, and b) a N,N'-disubstituted aminomethyl triazole derivative of the formula (IV):

$$T^2\text{—}CH_2\text{—}NR^4{}_2 \qquad (IV)$$

in which
$T^2$ is an optionally substituted 1,2,3-benzotriazole group, or an optionally substituted 1,2,4-triazole group, and
$R^4$ is a hydroxyalkyl group.

It has surprisingly been found that formulations in accordance with the present invention are soluble in both oil and water and give corrosion protection to a range of metals.

Suitably, the acyl amino acid derivative of formula (III) is organic hydrocarbon-soluble.

Suitably, the N,N'-disubstituted aminomethyl triazole derivative of formula (IV) is water-soluble.

Generally, unless otherwise stated herein or unless the context requires otherwise, any alkyl may be either a straight or branched chain alkyl. Except where otherwise stated in this specification optional substituents of an alkyl group may include, aryl, alkenyl, or alkoxy ether groups. Except where otherwise stated in this specification the alkyl group may optionally be interrupted, for example, by an unsaturated linkage and/or an oxygen. Each alkyl group may comprise one or more substituents. Suitably, alkyl groups are unsubstituted.

Preferably, $R^4$ is $C_{10}$–$C_{20}$ alkyl. More preferably $R^4$ is $C_{11}C_{17}$ alkyl. Especially preferred $R^4$ groups are $C_{11}H_{23}$ derived from lauric acid and $C_{17}H_{33}$ derived from oleic acid.

Preferably $R^5$ is methyl. Preferably, $R^5$ is an unsubstituted methyl group.

Generally, unless otherwise stated herein or unless the context requires otherwise, any benzotriazole group may be optionally substituted by one or more alkyl groups. Suitable substituents include $C_1$–$C_4$ alkyl groups. A benzotriazole group may comprise four substituents or less. Suitably, a benzotriazole group comprises three substituents or less, preferably two substituents or less and more preferably one substituent or less. Suitably, a benzotriazole group is unsubstituted. Suitably, alkyl group substituents of benzotriazole groups are unsubstituted.

Preferably, $T^2$ is a 1,2,3-benzotriazole group. More preferably $T^2$ is a benzotriazole or tolutriazole.

Suitably, $R^6$ is a hydroxyalkyl group containing from 1–4 carbon atoms. Suitably, $R^6$ is a hydroxyalkyl group containing from 1–4 hydroxyl groups. Suitably, the hydroxyalkyl group comprises an unsubstituted hydroxyalkyl group. Preferably, $R^6$ is 2-hydroxyethyl or hydroxypropyl most preferably $R^6$ is 2-hydroxyethyl. The $R^4$ groups of formula (IV) may comprise the same or different hydroxyalkyl group.

Suitably, the formulation is soluble in organic hydrocarbons. Suitably the formulation is soluble in water. Preferably, the formulation is soluble in both organic hydrocarbons and water.

Generally, unless otherwise stated herein or otherwise required by the context, a formulation is soluble in organic hydrocarbons if at 25° C. and 1 atmosphere pressure it has a solubility of at least 0.000001 wt %, suitably at least 0.0001 wt %, preferably at least 0.01 wt %, more preferably at least 0.5 wt % and particularly at least 1.0 wt % in Naphthenic oil. The naphthenic oil is suitably Nynas T22 (trade mark) available from Nynas Naphthenics Ltd.

Generally unless otherwise stated herein or otherwise required by the context, a formulation is soluble in organic hydrocarbons if at 25° C. and 1 atmosphere pressure it has a solubility of at least 0.00001 wt %, suitably at least 0.0001 wt %, preferably at least 0.01 wt %, more preferably at least 0.5 wt % and particularly at least 1.0 wt % in toluene.

Generally, unless otherwise stated herein or otherwise required by the context, a formulation is soluble in water if at 25° C. and 1 atmosphere pressure it has a solubility of at least 0.000001 wt %, suitably at least 0.0001 wt %, preferably at least 0.01 wt %, more preferably at least 0.5 wt % and particularly at least 1.0 wt % in water. The water used to determine solubility is suitably laboratory grade de-ionised water.

Solubility should be tested by preparing a mixture of the appropriate concentration of formulation to solvent, warming the mixture, with stirring, at 40–50° C. for approximately 15 minutes. The mixture should then be left to stand overnight at ambient temperature and then visually inspected to ascertain whether or not complete solution has been obtained.

The formation may comprise more than one acyl amino acid derivative of the formula (III). The formulation may comprise more than one N,N'-disubstituted aminomethyl triazole derivative of the formula (IV).

Especially preferred mixtures are those from combination of N-oleoyl sarcosine and bis (2-hydroxyethyl) amino methyl tolutriazole, N-oleoyl sarcosine and bis (2-hydroxyethyl) amino methyl benzotriazole, N-lauroyl sarcosine and bis (2-hydroxyethyl) amino methyl tolutriazole and N-lauroyl sarcosine and (2-hydroxyethyl) amino methyl benzotriazole.

The optimum ratio of compound (III) to compound (IV) will depend on the degree of solubility required in each solvent. For example, higher levels of compound (III) will generally increase solubility in organic hydrocarbons and higher levels of compound (IV) will generally increase solubility in water.

The formulation may comprise less than 99 wt %, less than 95%, less that 80 wt % or less than 55 wt % of the acyl amino acid of formula (III).

The formulation may comprise greater than 1 wt %, greater than 5 wt %, greater than 20 wt % and greater than 45 wt % of the acyl amino acid of formula (III).

The formulation may comprise less than 99 wt %, less than 95 wt %, less than 80% wt, less than 55 wt %, of the N,N'-disubstituted aminomethyl triazole of formula (IV).

The formulation may comprise greater than 1 wt %, greater than 5 wt %, greater than 20 wt % and greater than 45 wt % of the N,N'-disubstituted aminomethyl triazole of formula (IV).

The mole ratio of compound (III) to compound (IV) is suitably between 1:02. and 1:2, preferably between 1:0.5 and 1:1 and more preferably between 1:0.6 and 1:0.9.

The formulation may further comprise minor amounts of additional additives. Suitably, the formulation comprises less than 10 wt %, preferably less than 5 wt % and more preferably less than 1 wt % in total of additional additives.

Non-limiting examples of additional additives are:
phenolic or aminic antioxidants, further corrosion or rust inhibitors, further metal deactivators, extreme pressure/antiwear additives, viscosity index improvers, pour point depressants, dispersants/surfactants, antifoams, biocides, complexing agents.

Non-limiting examples of suitable phenolic antioxidants are:
2,6-di-t-butyl phenol derivatives, 2-t-butyl-6-methyl phenol derivatives.

Non-limiting examples of suitable aminic antioxidants are:
alkylated diphenylamine derivatives and alkylated a-naphthylamine derivatives.

Non-limiting examples of suitable corrosion inhibitors/rust inhibitors are:
alkyl or aryl mono, di or poly carboxylic acids and their ammonium salts, amine alkanolamine or metal salts, alkenyl succinic acid and derivatives, aryl sulphonic acid salts, phosphoric acid, poly phosphoric acids and derivatives, phosphoric acids, fatty acid alkanolamides, imidazoline derivatives.

Non-limiting examples of suitable metal de-activators are:
1,2,4-triazole derivatives, benzotriazole and alkylated benzotriazole derivatives, mercaptobenzothiazole and its sodium salt.

Non-limiting examples of suitable extreme pressure/antiwear additives are:
zinc dialkyl dithiophosphates, amine salts of substituted phosphoric acid derivatives, triphenyl phosphorothioate and alkylated derivatives, molydenum dithiocarbamate derivatives, tri-aryl phosphates, sulphurised hydrocarbons e.g. vegetable oils.

Non limiting examples of suitably viscosity index improvers/pour depressants are: polyacrylates, polymethacrylates, olefin co-polymers, styrene-acrylate co-polymers, alkylated naphthalene derivatives.

Non-limiting examples of suitable dispersants/surfactants are:
polybutenyl succinic acid amides, basic magnesium, calcium and barium sulphonates and phenolates.

Non-limiting examples of suitable antifoams are:
polysiloxanes, ethylene/propylene oxide co-polymers, Non limiting examples of suitable biocides are:
isothiazolone derivatives, boron amide derivatives.

Non-limiting examples of suitable complexing agents are:
ethylene diamine tetra-acetic acid and derivatives, citric acid.

Compounds (III) and compounds (IV) are commercially available or may be prepared by conventional methods as described in the scientific literature. For example, compounds (III) may be prepared by reaction of an appropriate acyl chloride with an appropriate amino acid. Compounds (IV) may be prepared by reacting an appropriate triazole derivative with formaldehyde and a hydroxyl-containing secondary amine by the Mannich reaction.

According to a second aspect of the invention there is provided a composition comprising:
a) a formulation according to the first aspect of the invention and
b) a diluent.

Suitable diluents include water, organic hydrocarbons or a mixture thereof.

Suitable organic hydrocarbons include natural or synthetic aliphatic or aromatic compounds of carbon and hydrogen, optionally containing unsaturated linkages, ester groups, or hetero atoms e.g. oxygen. Non-limiting examples of suitably organic hydrocarbons are:
octane, kerosine, white spirit, petroleum-based hydrocarbons such as naphthenic oils or paraffinic oils, vegetable oils, synthetic carboxylic acid ester, phosphate esters, poly α olefins, poly isobutylenes, alkylated aromatic hydrocarbons, ethylene glycol, propylene glycol, polyalkylene glycols, glycol ethers.

The water according to the second aspect of the invention may be distilled water, de-ionised water, natural water or synthetic hard water, for example.

Preferably, the diluent comprises one or more of water, glycols or mineral oils. More preferably, the diluent comprises propylene glycol and/or naphthenic oil.

The composition of the second aspect of the invention advantageously provides the formulation of the first aspect of the invention in a form which may facilitate use and/or handling thereof.

The composition of the second aspect of the invention may be manufactured by mixing the formulation of the first aspect of the invention with the diluent. Alternatively, or in addition, the composition of the second aspect of the invention may be provided by preparing the formulation of the first aspect in the presence of the diluent.

The composition according to the second aspect of the invention may be further diluted in use, by addition of any of the diluents listed above.

The composition according to the second aspect of the invention may comprise at least 5 wt % and suitably at least 20 wt % of the formulation according to the first aspect.

The composition according to the second aspect of the invention may comprise less than 95 wt %, suitably less than 90 wt % of the formulation according to the first aspect.

The composition according to the second aspect of the invention may comprise at least 5 wt % and suitably at least 20 wt % diluent.

The composition according to the second aspect of the invention may comprise less than 95 wt % and suitably less than 90 wt % diluent.

The composition may comprise further additives. Suitably, the composition may comprise 5 wt %, or 3 wt % or 1 wt % or less of further additives.

According to a third aspect of the present invention there is provided a composition of accordance with the second aspect of the invention in contact with a ferrous metal surface, a non-ferrous metal surface, or a combination thereof.

Non-limiting examples of suitable metals are:

iron, copper, aluminum, magnesium, zinc, cobalt, tin and mixtures and/or alloys thereof.

According to a fourth aspect of the present invention there is provided a kit comprising (a) an acyl amino acid derivative of a formula (III) compound:

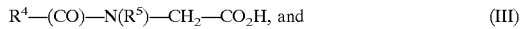

$R^4$—(CO)—N($R^5$)—$CH_2$—$CO_2$H, and   (III)

(b) a N,N$^1$-disubstituted aminomethyl triazole derivative of a formula (IV) compound:

$T^2$—$CH_2$—$NR^6_2$.   (IV)

The kit may comprise components (a) and (b) in such a ratio, that when mixed together, the resulting combination is soluble in water, organic hydrocarbons or a mixture thereof.

The kit may further comprise a solvent comprising water and/or organic hydrocarbon or a mixture thereof.

According to a fifth aspect of the present invention there is provided a method of producing a formulation comprising contacting:

(a) an acylamino acid derivative of formula (III),

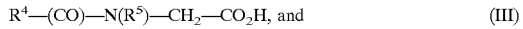

$R^4$—(CO)—N($R^5$)—$CH_2$—$CO_2$H, and   (III)

(b) a N,N'-disubstituted aminomethyl triazole derivative of formula (IV),

$T^2$—$CH_2$—$NR^4_2$.   (IV)

Suitably, (a) and (b) are contacted in such a ratio that the resulting mixture is soluble in water, organic hydrocarbons or a mixture thereof.

Suitably, (a) and (b) are contacted by mixing with stirring at an elevated temperature. Temperature from room temperature to 100° C. may be employed, but preferably the temperature is kept below 50° C.

Mixing times may vary from a few minutes to several hours. Suitably, the mixing time is at least 1 minute, preferably at least 5 minutes and more preferably at least 10 minutes. Suitably, the mixing time is less than 3 hours, preferably less than 2 hours and more preferably less than 1 hour. Suitably, mixing times are between 10–30 minutes.

The mixing step may further include addition of a solvent. Suitably, a solvent is added to the compounds before stirring at an elevated temperature. Alternatively, or in addition, a solvent may be added after the process of stirring at an elevated temperature. Alternatively, or in addition, a solvent is added during the process of stirring at an elevated temperature. Suitable solvents include water, organic hydrocarbons or a mixture thereof.

According to a sixth embodiment of the present invention there is provided use of a formulation according to one of the preceding aspects of the invention as a corrosion inhibitor, as a rust inhibitor, as a metal passivator, as a metal deactivator, or as a multipurpose additive for a combination of the aforementioned purposes. The formulation may also be used as an emulsifier or as a surfactant.

Suitably, the formulation is used in a concentration sufficient to be effective in inhibiting corrosion. The effective levels of formulation will vary depending on the application. Suitably, concentrations of between 0.000001 wt % and 5 wt % are used, preferably concentrations of between 0.05 wt % and 2 wt % are used.

The use according to the sixth embodiments of the invention may be in:

hydrocarbon, synthetic and water-based hydraulic fluids, gear oils, chain oils, circulating oils, turbine oils, crankcase oils, compressor oils, bearing lubricants, wire drawing lubricants, soluble oils, oil-based metalworking fluids, metalworking fluid emulsions, grinding fluids, heat transfer oils, electrical insulating oils, greases, brake fluids, fuels, engine coolants, refrigeration lubricants, surface cleaners, fountain solutions, aircraft de-icing fluids, de-watering fluids, penetrating fluids, polishes, adhesives, water-based paints, industrial cooling water systems, and solutions used in the electronics industry for printed circuit board manufacture.

According to a seventh embodiment of the invention there is provided a method of inhibiting corrosion of a metal comprising contacting a formulation according to the first aspect of the invention and a fluid, which fluid contacts a metal susceptible to corrosion.

Any aspect of the invention may be combined with any one or more other aspect of the invention.

Formulations in accordance with the present invention find utility in a wide range of industrial oil, fuel, water, emulsion-based and surface coating systems where corrosion protection of a range of one or more metals is required.

The following examples further illustrate, but not limit, the present invention. Unless otherwise indicated, parts and percentages are by weight.

Sample formulations in accordance with the present invention were prepared. Formulations outside the present invention where also prepared for comparative purposes. The formulations were then tested for solubility and corrosion inhibition properties.

EXAMPLES 1–15

Details of example formulations in accordance with the invention are given in Table 1 as Examples 1–15.

The formulations of Examples 1–15 were prepared by mixing the appropriate amounts of compounds of type (III) and compounds of type (IV) in a 100 ml glass conical flask and warming at 40–50° C., with stirring, for approximately 15 minutes.

Triazole derivative A is water-soluble commercial product containing bis (hydroxyethyl) aminomethyl tolutriazole isomers, sold by Ciba Specialty Chemicals under the trade name Irgamet 42 (RTM). It includes 25 wt % of water.

Triazole derivative B is Irgamet 42 (RTM) as referred to above, after substantially all of the water has been removed by vacuum stripping up to 50° C.

Examples 16 and 17 illustrate preparation of a composition according to the second aspect of the invention.

EXAMPLE 16

9.33 parts of water-soluble triazole derivative A are dissolved in 150 parts of de-ionised water and the solution warmed to 40° C., with stirring in a 250 ml beaker. 14.13 parts of N-oleoyl sarcosine, sold by Ciba Speciality Chemicals, are then added to the solution of triazole derivatives A over approximately 10 minutes. The mixture is stirred at 40° C. for a further 10 minutes and allowed to cool. The resulting product is a clear, pale yellow solution containing 13.5% solids.

EXAMPLE 17

10.09 parts of N-oleoyl sarcosine are dissolved in 150 parts of toluene and the solution warmed to 40° C., with stirring in a 250 ml beaker. 5.0 parts triazole derivative A are then added over approximately 10 minutes. The mixture is stirred at 40° C. for a further 10 minutes and allowed to cool. The resulting product is a clear, pale yellow solution containing 9.1% solids.

COMPARATIVE EXAMPLES 18–22

Details of the formulas of Comparative Examples 18–22 are given in Table 2:

The formulations of Examples 18–22 are prepared by mixing the appropriate amounts of carboxylic acid and base in a 100 ml glass conical flask and warming at 40–50° C., with stirring, for approximately 15 minutes. In these Examples, either Compound (III) or Compound (IV) of the invention is replaced by closely related compounds outside the invention.

Solubility Testing

The results of solubility testing of Examples 1–15 and Comparative Examples 18–22 in water and in naphthenic oil, are shown in Table 3. The results of solubility testing of Examples 2, 3, 6 and 8 in other solvents are shown in Table 4.

To test the solubility of a formulation, solutions of each formulation having a range of concentrations for each of Examples 1–15 and Comparative Examples 18–22 of, for example, 0.5%, 1.0%, 5.0%, 20% were prepared. Preparation involved taking the relevant amount of each Example formulation, mixing it with the appropriate amount of solvent to get the desired concentration and warming the solutions with stirring at 40–50° C., for approximately 15 minutes.

The solution were then allowed to stand overnight at room temperature and then visually inspected to see if complete solution had occurred. For example, solubilities described as >1.0% mean that 1.0% solutions are completely soluble. Solubilities described as <1.0% meant that 1.0% solutions are not completely soluble.

Examination of Tables 3 and 4 shows that formulations according to invention show solubility in both water and naphthenic oil. The results also show formulations in accordance with the invention exhibit solubility in solvents with polarities ranging from water to paraffinic mineral oil.

The comparative examples do not show dual solubility, being soluble either in organic hydrocarbon or water, or neither, but not both.

Corrosion Inhibitor/Metal Passivator Testing

The results of testing of formulations in accordance with the invention for corrosion inhibition are given in Table 5. Details of the test methods are given below.

Ferrous Metal Corrosion Testing (i) Coupon Test

A 70 mm×40 mm mild steel test coupon is cleaned by polishing with silicon carbide abrasive paper and degreased by immersion in toluene for one hour. The coupon is dried in the oven at 90° C. The clean, dry coupon is place in a 100 ml beaker containing 50 ml of a solution of the Example formulation comprising a 0.2% solution of the Example formulation in de-ionised water. The beaker is covered with a petri dish and placed in a water bath at 90° C. for 1 hour. The coupon is then removed, allowed to dry at room temperature and inspected for signs of corrosion or staining. Examples where the coupons show visual signs of corrosion or staining are not considered effective corrosion inhibitors.

Examination of Table 5 shows that test solutions containing formulations in accordance with the invention give coupons with no change over the initial clean and polished coupons. By comparison, a blank test with de-ionised water gives a coupon with a severe staining and corrosion showing that formulations according to the invention have corrosion inhibitor properties for mild steel.

(ii) XP 287 Test (Institute of Petroleum Test Designation IP 287/82)

This method measures the rust prevention characteristics of aqueous solutions or emulsions by the chip/filter paper method.

Cast iron chips are washed with acetone and dried in the oven at 105° C. The chips are sieved onto a filter paper placed in a petri dish so as to cover a 35 mm square with a single layer. 2 ml of a test solution prepared by dissolving the example formulation in synthetic hard water [0.3449 g/l calcium sulphate dihydrate in distilled water] is then pipetted onto the chips so that they are all thoroughly wetted. The dish is covered with a lid and allowed to stand at room temperature for 2 hours. The filter paper is then removed, washed with water and allowed to dry. The area of staining on the paper is assessed. The test is repeated at various dilutions to determine the point where there is significant increase in stained area. This dilution is known as the break point and is expressed as the dilution (ratio of water to product) at the break point.

Examination of Table 5 shows that the inventive formulation of Example 3 gives a break point of 30:1 proving that the mixture has rust inhibiting properties for cast iron.

Aluminum Corrosion Testing

A 70 mm×40 mm aluminum test coupon is cleaned by immersion in toluene for one hour and then dried in the oven at 90° C. The clean, dry coupon is placed in a 100 ml beaker containing 50 ml of test solution comprising 0.2% of an example formulation according to the invention in de-ionised water. The beaker is covered with a petri dish and placed in a water bath at 90° C. for 20 minutes. The coupon is then removed, allowed to dry at room temperature and inspected for signs of corrosion or staining. Examples where the coupons show visual signs of corrosion or staining are not considered effective corrosion inhibitors.

Examination of Table 5 shows that test solutions containing formulations in accordance with the invention give coupons with no change over the initial clean and polished coupons. By comparison, a blank test with de-ionised water gives a coupon with severe staining and corrosion showing that formulations in accordance with the invention show corrosion inhibitor properties for aluminum.

Copper Passive Testing

Copper Strip Tarnish ASTM D 130-75

The test is designed to measure the corrosiveness to copper of the hydrocarbons. Details are given in the Annual Book of ASTM Standards published by the American Society for Testing and Materials. A clean, dry copper strip is placed in 30 ml test solution comprising 0.1% of an example formulation in accordance with the invention in mineral oil containing 100 ppm polysulphide and heated for 3 hours at 100° C. Results are determined by comparison with the ASTM Copper Strip Corrosion Standards and giving the appropriate classification.

Examination of Table 5 shows that the formulation of Example 3 has a 1a classification in both of the mineral oils tested compared with blank ratings of 3b for the mineral oils (containing polysulphide) alone, showing the formulation of Example 3 to be a corrosion. inhibitor/passivator for copper.

The results in Table 5 show that formulations of the invention show activity as corrosion inhibitors and metal passivators for ferrous metals, aluminum and copper, both in aqueous and non-aqueous systems.

TABLE 1

Examples of Mixtures of the Invention

| Example No. | Compound Type (III) | Parts of (III) | Compound Type (IV) | Parts of (IV) | Mole Ratio (III)/(IV) |
|---|---|---|---|---|---|
| 1 | N-oleoyl sarcosine | 10.59 | Triazole Derivative A | 6 | 1:06 |
| 2 | N-oleoyl sarcosine | 10.69 | Triazole Derivative A | 6.57 | 1:0.65 |
| 3 | N-oleoyl sarcosine | 14.13 | Triazole Derivative A | 9.33 | 1:0.7 |
| 4 | N-oleoyl sarcosine | 10.59 | Triazole Derivative A | 6.57 | 1:0.75 |
| 5 | N-oleoyl sarcosine | 7.06 | Triazole Derivative A | 5.33 | 1:0.8 |
| 6 | N-oleoyl sarcosine | 10.59 | Triazole Derivative A | 8.49 | 1:0.85 |
| 7 | N-oleoyl sarcosine | 7.07 | Triazole Derivative A | 6 | 1:0.9 |
| 8 | N-oleoyl sarcosine | 10.09 | Triazole Derivative B | 5 | 1:0.7 |
| 9 | N-oleoyl sarcosine | 9.2 | Triazole Derivative B | 5.21 | 1:0.8 |
| 10 | N-oleoyl sarcosine | 12.09 | Triazole Derivative B | 7.28 | 1:0.85 |
| 11 | N-oleoyl sarcosine | 7.85 | Triazole Derivative B | 5 | 1:0.9 |
| 12 | N-lauroyl sarcosine | 5.42 | Triazole Derivative A | 4.66 | 1:0.7 |
| 13 | N-lauroyl sarcosine | 5.42 | Triazole Derivative A | 6.66 | 1:1 |
| 14 | N-lauroyl sarcosine | 10.84 | Triazole Derivative B | 7 | 1:0.7 |
| 15 | N-lauroyl sarcosine | 5.71 | Triazole Derivative B | 5.26 | 1:1 |

TABLE 2

Comparative Examples

| Example No. | Carboxylic Acid | Parts of Acid | Base | Parts of Base | Mole Ratio Acid/Base |
|---|---|---|---|---|---|
| 18 | N-oleoyl sarcosine | 7.06 | Benzotriazole | 1.67 | 1:07 |
| 19 | N-oleoyl sarcosine | 7.53 | Tolutriazole | 2 | 1:07 |
| 20 | N-oleoyl sarcosine | 7.06 | Triethanolamine | 2.09 | 1:07 |
| 21 | Oleic Acid | 8.08 | Triazole Derivative A | 6.67 | 1:07 |
| 22 | Lauric Acid | 5.75 | Triazole Derivative A | 6.67 | 1:07 |

TABLE 3

Solubility Tests in Water and Naphthenic Oil

| Formulation of Example No. | Solubility (%) | |
|---|---|---|
| | Water* | Naphthenic Oil* |
| 1 | ca 0.5 | ca 0.3 |
| 2 | ca 0.5 | ca 0.3 |
| 3 | >20 | ca 2.5 |
| 4 | >20 | ca 1.0 |
| 5 | >20 | ca 0.5 |
| 6 | >20 | ca 0.5 |
| 7 | >20 | ca 0.5 |
| 8 | >20 | >10 |
| 9 | >20 | >1.0 |
| 10 | >20 | >1.0 |
| 11 | >20 | ca 1.0 |
| 12 | >15 | >1.0 |
| 13 | >15 | >1.0 |
| 14 | >15 | >5.0 |
| 15 | >15 | >1.0 |
| Comparative Example No. | | |
| 18 | <1.0 | >2.5 |
| 19 | <1.0 | >2.5 |
| 20 | >2.0 | <0.5 |
| 21 | <0.5 | <0.5 |
| 22 | <0.5 | <0.5 |

*Solvents:
Water = Laboratory Grade De-ionised Water
Naphthenic Oil = Nynas T 22 supplied by Nynas Naphthenics Limited

TABLE 4

Solubility Tests in Additional Solvents

| Mixture of Example No. | Solubility (%) | | | | |
|---|---|---|---|---|---|
| | Paraffinic Oil* | Gasoline* | Toluene* | PAG* | Ethylene Glycol* |
| 2 | | | | >1.0 | |
| 3 | | >5.0 | | >1.0 | |
| 6 | | | | >1.0 | |
| 8 | >1.0 | >5.0 | >10 | ca 3.0 | >5.0 |

*Solvents
Paraffinic Oil = 100 Solvent Neutral Oil supplied by Mobil UK
Gasoline = Commercial 95 Octane Esso Unleaded Petrol
Toluene = 99% Laboratory Reagent Grade
PAG = Breox 50 A20 (RTM) supplied by Inspec UK Ltd
Ethylene Glycol = Laboratory Reagent Grade Ethanediol

TABLE 5

Corrosion Inhibitor/Metal Passivator Tests

| | Fe Corrosion | | Al Corrosion | Cu Passivation | |
| --- | --- | --- | --- | --- | --- |
| | | IP 287 Test | | ASTM D 130 Test Ratio | |
| Example No. | Coupon Test | Breakpoint | Coupon Test | Oil 1* | Oil 2* |
| Blank (no additive) | Severe corrosion/staining | | Severe corrosion/staining | 3b | 3b |
| 2 | No corrosion/staining | | No corrosion/staining | | |
| 3 | No corrosion/staining | 30:1 | No corrosion/staining | 1a | 1a |
| 6 | No corrosion/staining | | No corrosion/staining | | |
| 8 | No corrosion/staining | | No corrosion/staining | | |

*Oil 1 = 100 Solvent Neutral Oil supplied by Mobil
*Oil 2 = 500 Solvent Neutral Oil supplied by Batoyle Freedom Group The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A formulation comprising:
   a) an acyl amino acid derivative of the formula (III):

$$R^1-(CO)-N(R^5)-CH_2-CO_2H \quad (III)$$ 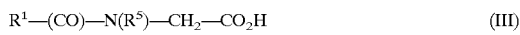

in which
   $R^4$ is $C_8-C_{30}$ optionally substituted alkyl and $R^5$ is hydrogen or methyl, and
   b) a N,N$^1$-disubstituted aminomethyl triazole derivatives of the formula (IV):

$$T^2-CH_2-NR^4_2 \quad (IV)$$ 

in which
   $T^2$ is an optionally substituted 1,2,3-benzotriazole group, or an optionally substituted 1,2,4-triazole group, and
   $R^6$ is a hydroxyalkyl group.

2. A formulation according to claim 1, wherein the formulation is soluble in organic hydrocarbons.

3. A formulation according to claim 2, wherein the solubility at 25° C. and 1 atmosphere pressure is at least 0.000001 wt % in Naphthenic oil.

4. A formulation according to claim 2, wherein the solubility at 25° C. and 1 atmosphere pressure is at least 0.000001 wt % in toluene.

5. A formulation according to claim 1, wherein the formulation is soluble in water.

6. A formulation according to claim 5, wherein the solubility at 25° C. and 1 atmosphere pressure is at least 0.000001 wt % in water.

7. A formulation according to claim 1, wherein the formulation is soluble in both water and organic hydrocarbons.

8. A formulation according to claim 1, wherein the mole ratio of the formula (III) compound to the formula (IV) compound is from 1:0.2 to 1:2.

9. A formulation according to claim 1, which comprises further additives.

10. A composition comprising:
    a) a formulation according to claim 1 and
    b) a diluent.

11. A composition according to claim 9, wherein the diluent is water, organic hydrocarbon, or a mixture thereof.

12. A composition according to claim 11, wherein the organic hydrocarbon comprises natural or synthetic aliphatic or aromatic compounds of carbon and hydrogen, optionally containing unsaturated linkages, ester groups or hetero atoms.

13. A composition according to claim 11, wherein the organic hydrocarbon is selected from the group comprising:
    octane, kerosine, white spirit, petroleum-based hydrocarbons such as naphthenic oils or paraffinic oils, vegetable oils, synthetic carboxylic acid ester, phosphate esters, poly α olefins, poly isobutylenes, alkylated aromatic hydrocarbons, ethylene glycol, propylene glycol, polyalkylene glycols, glycol ethers.

14. A composition according to claim 11, wherein water is selected from the group comprising:
    distilled water, de-ionized water, natural water and synthetic hard water.

15. A composition according to claim 10, in contact with a ferrous metal surface, a non-ferrous metal surface or a combination thereof.

16. A kit comprising
(a) an acyl amino acid derivative of formula (III):

$$R^4-(CO)-N(R^5)-CH_3-CO_2H, \quad (III)$$

and,
(b) a N-N'-disubstituted aminomethyl triazole derivative of formula (IV):

$$T^2-CH_3-NR^6{}_2. \quad (IV)$$

17. A kit according to claim 16, further comprising a solvent comprising water and/or organic hydrocarbon or a mixture thereof.

18. A kit according to claim 16 comprising quantities of (a) and (b) in such a ratio that, when mixed together, the resulting formulation is soluble in water, organic hydrocarbon or a mixture thereof.

* * * * *

UNITED STATES PATENT AND TRADEMARK OFFICE
CERTIFICATE OF CORRECTION

PATENT NO. : 6,984,340 B1
APPLICATION NO. : 09/668518
DATED : January 10, 2006
INVENTOR(S) : Arthur Albert Brady and Brian George Clubley It is certified that error appears in the above-identified patent and that said Letters Patent is hereby corrected as shown below:

On title page, please insert --(30) Foreign Application Priority Data
October 14, 1999 (UK) 9924358.6--

Signed and Sealed this

Fifteenth Day of January, 2008

JON W. DUDAS
*Director of the United States Patent and Trademark Office*